(No Model.) 2 Sheets—Sheet 2.
J. BROWN.
BOOK REST.
No. 462,467. Patented Nov. 3, 1891.
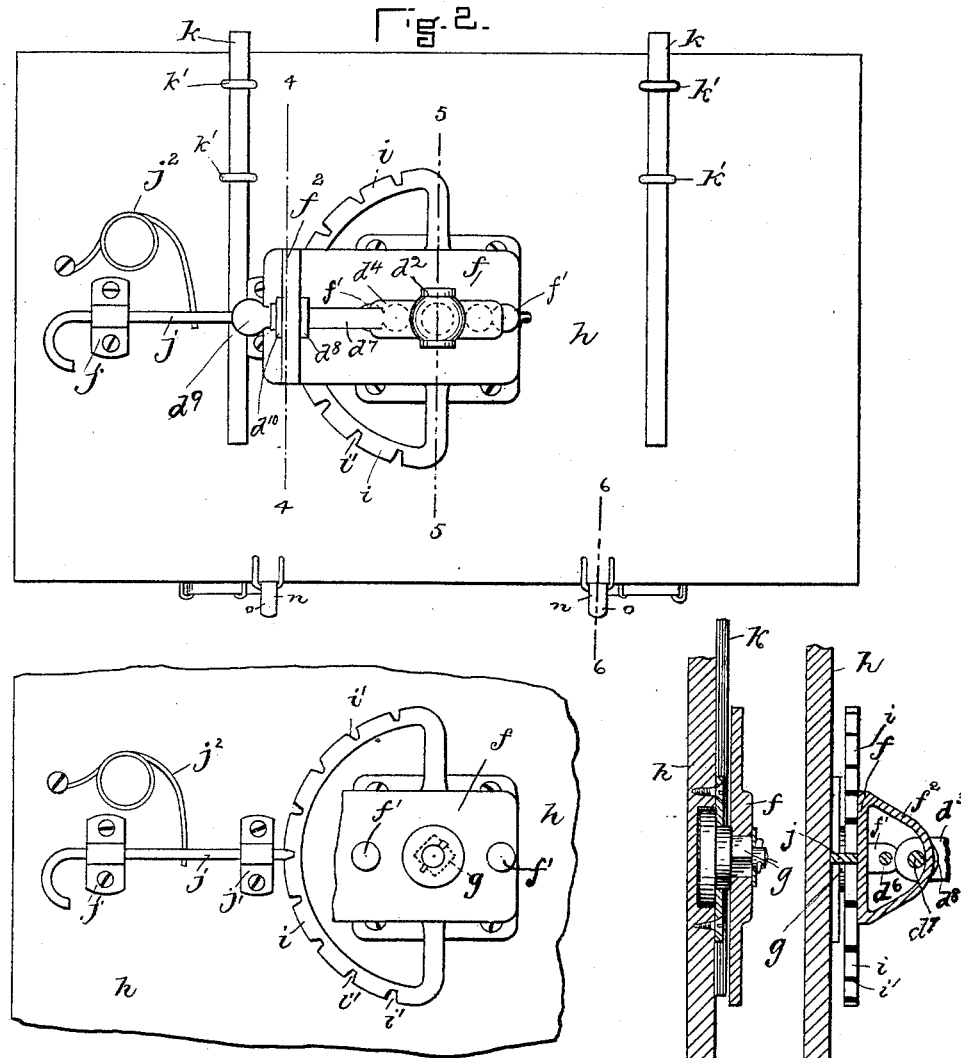
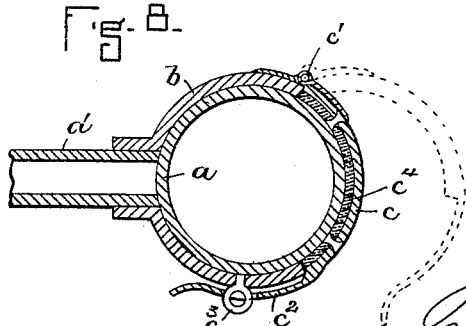
WITNESSES.
J. T. Ball.
Ewing W. Hawken
INVENTOR.
J. Brown,
by Wight, Brown & Crossley,
Attys.

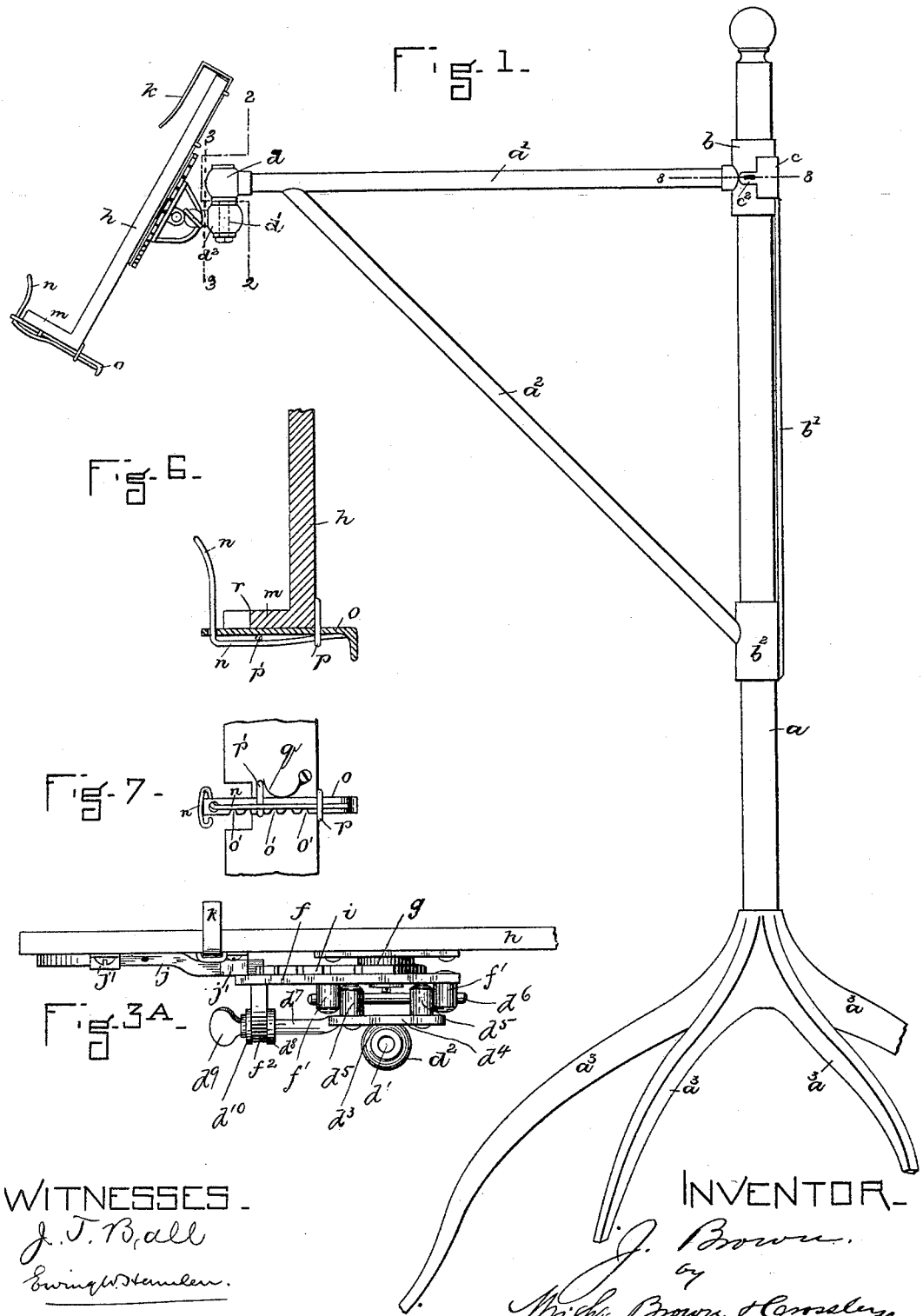

UNITED STATES PATENT OFFICE.

JULIUS BROWN, OF BOSTON, MASSACHUSETTS.

BOOK-REST.

SPECIFICATION forming part of Letters Patent No. 462,467, dated November 3, 1891.

Application filed December 29, 1890. Serial No 376,021. (No model.)

*To all whom it may concern:*

Be it known that I, JULIUS BROWN, of Boston, in the county of Suffolk and State of Massachusetts, have invented certain new and useful Improvements in Book-Rests, of which the following is a specification.

This invention relates to book-rests; and it has for its object to provide an adjustable book-rest which shall be capable of adjustment in every direction and of being rigidly held in position after each adjustment, and which shall at the same time be of simple and strong construction.

The invention consists of a book-rest of the improved construction which I will now proceed to describe.

In the accompanying drawings, forming a part of this specification, Figure 1 represents a side elevation of my improved book-rest with its stand. Fig. 2 represents a section on line 2 2 of Fig. 1, showing a back view of the rest. Fig. 3 represents a section on the plane of line 3 3 of Fig. 1, looking toward the left, a part of one of the plates being broken away. Fig. 3ᵃ represents a top view of the book-rest and attachments shown in Fig. 2. Fig. 4 represents a section on line 4 4 of Fig. 2. Fig. 5 represents a section on line 5 5 of Fig. 2. Fig. 6 represents a section on line 6 6 of Fig. 2, and Fig. 7 represents a bottom plan view of a portion of the rest, showing one of the lower hooks. Fig. 8 represents a section on line 8 8 of Fig. 1, looking downwardly. The Figs. 2, 3, 3ᵃ, 4, 5, 6, 7, and 8 are all on a larger scale than Fig. 1 for the sake of clearness.

The same letters of reference indicate the same parts in all the figures.

In the drawings, $a$ represents the upright or vertical member, $a'$ the horizontal member, and $a^2$ a stay or brace, constituting a stand or support for my improved book-rest, the upright $a$ being provided with suitable legs or feet $a^3$. The lower end of the stay $a^2$ is attached to a collar $b^2$, sliding upon the upright $a$ and connected by a rod or strip $b'$ with a collar $b$ upon said upright, to which collar $b$ the inner end of the horizontal arm $a'$ is attached. The collar $b$ approximately fits the upright and is adapted to slide thereon. The said collar $b$ is cut away at a portion of its outer side to form a hole in which fits a gate $c$, hinged at $c'$ to the collar $b$, and provided at its swinging end with a latch or hook $c^2$, which is adapted to engage a staple or pin $c^3$ on the other side of the collar $b$ from the hinge $c'$. The gate $c$ is provided on its inner side with a pad $c^4$, preferably of rubber, which is arranged to fit into the hole cut in the collar $b$ and to press upon the periphery of the upright $a$. The pad $c^4$ is made of some yielding material and is of somewhat greater thickness than the collar $b$, so that when the gate is closed the catch $c^2$, being engaged with the staple $c^3$, holds said gate in its closed position and presses the pad $c^4$ against the upright $a$, and by the frictional hold of said pad on the upright supports the supporting-frame of the book-rest, composed of the arm $a'$, stay $a^2$, rod or strip $b'$, and collars $b^2$ and $b$ at any desired position on said upright.

From the foregoing it will be seen that the supporting-frame and the book-rest thereon are readily adjustable vertically. To move the said frame up or down, it is only necessary to open the gate $c$, move the frame to the desired position, and close the gate again, thus locking the frame to the upright.

At the outer end of the arm $a'$ is a bearing $d$, having a pivot-pin $d'$, passing vertically therethrough and also passing into a similar bearing $d^2$ below the bearing $d$, thus allowing the book-rest to swing horizontally to any desired extent. The bearing $d^2$ has an extension or arm $d^3$ projecting forward therefrom, and said extension has a plate $d^4$ on its forward end. The bearing $d^2$, arm $d^3$, and plate $d^4$ are preferably made in one piece. The plate $d^4$ has two bearings $d^5$, projecting from its forward side, one near each end, and through said bearings passes a shaft or pin $d^6$. The shaft or pin $d^6$ also passes through two bearings $f' f'$, which project backwardly from a plate $f$, to which they are rigidly affixed. To the plate $f$ is pivoted by a pin $g$ at its center the book-rest $h$, the said pin $g$ being rigidly affixed to said plate $f$ and moving as a pivot in the rest $h$. Integral with the plate $f$, and projecting backwardly therefrom at one end thereof, is a band or hoop $f^2$, the rearmost portion of which is of the form of an arc of a circle, as shown most clearly in Fig. 4. The said band or loop passes over one end of a bar or rod $d^7$, which projects from and is rigidly attached to one end of the plate $d^4$. Said bar is shouldered, as at $d^8$, and the band $f^2$ is arranged with one of its edges bearing on said shoulder. The end of the bar or rod $d^7$ is provided with a thumb-screw $d^9$, and said screw is adapted to tighten a washer $d^{10}$ on the other edge of the band $f^2$, the said washer and the shoulder $d^8$ thus clamping the band $f^2$ between them.

From the foregoing it will be seen that the book-rest is adapted to swing forward and backward and can be fixed at any desired angle. When it is desired to adjust the book-rest in this direction, the thumb-screw $d^9$ is loosened, thus allowing the rest to be swung forward or backward on the pivot rod or shaft $d^6$. The arc of the circle in which the band $f^2$ is formed having said pivot-rod for its center, the band will move over the rod or bar $d^7$, between the shoulder $d^8$ and washer $d^{10}$, with its inner surface in contact with the periphery of said bar. When the rest is at the required angle, it may be fixed in that position by tightening the thumb-screw $d^9$, thus clamping the band $f^2$ between the washer $d^{10}$ and shoulder $d^8$, as already described.

$i$ represents a segmental piece which is rigidly attached to or formed integral with the plate $f$ and projecting from one side thereof. As shown in the drawings, it projects from said plate at the same side thereof as the band $f^2$, but from the forward face of said plate. Said segmental piece is preferably of semicircular form, as shown, and has in its outer edge a series of notches $i'$ $i'$ $i'$.

$j$ represents a catch or finger, which is attached to the back of the book-rest by staples or guides $j'$ $j'$, which are attached to the book-rest and in which the finger is adapted to slide back and forth. The finger $j$ is normally pressed inward by means of a spring $j^2$, attached to the back of the book-rest, as shown in Figs. 2 and 3. The point of the finger $j$ is adapted to engage one of the notches $i'$ on the segmental piece $i$ and its outer end is bent, as shown, to afford a convenient part to be grasped by the operator.

From the above it will be observed that the book-rest $h$ may be swung sidewise and fixed at any desired angle. To adjust the rest in this direction the operator first pulls the finger $j$ out of engagement with the segmental piece $i$ and then swings the rest upwardly or downwardly in a sidewise direction to the desired angle. In this motion the rest $h$ turns on the pivot-pin $g$, and the segmental piece is so placed that its arc has said pivot $g$ for its center. It will thus be seen that the point of said segmental piece opposite said finger $j$ is always at the same distance from said finger. When the rest is at the required angle the operator releases the finger $j$ and allows the same to engage the notch $i'$ of the segmental piece $i$, which may then be opposite its point, thus securely locking the rest in the desired position. It will be observed that the rest can be locked in as many different positions in this direction as there are notches $i'$ in the segmental piece $i$, and these may be few or many, as desired.

The book-rest $h$ is provided at its upper portion with two hooks $k$ $k$, which are adapted to slide in staples $k'$ $k'$, attached to the back of the rest, the hooks being adapted to hook over the top edge of a book and keep it in place on the rest, and being adjustable to different sizes of books by reason of their sliding movement in their staples $k'$. The force of gravity will keep them down on the edge of the book. The lower edge of the book-rest $h$ is provided with a shelf $m$, on which the book rests. $n$ $n$ represent two hooks, which are arranged under said shelf and which project upwardly from the front edge of the same. Each hook $n$ is attached at its rear end to a slide $o$. The said slide $o$ moves in guides or staples $p$ $p'$ on the bottom of the book-rest and is bent downwardly at its rear end to afford a part to be grasped by the operator. One side of said slide is provided with notches $o'$ $o'$, which are adapted to engage the wire forming one side of its forward staple or guide $p'$. The slide is pressed sidewise to keep its notches $o'$ in engagement with the side piece of the forward staple $p'$ by a spring $q$, attached to the under side of the shelf $m$, as shown in Fig. 7. The hook $n$ is attached at its rear end to the under side of the slide $o$ and passes therewith forward through the staple $p$. It then separates from the slide and passes forward clear of the staple $p'$, and its upturned end is passed through a hole made therefor near the front end of the slide $o$, as shown in Figs. 6 and 7.

It will be seen that the hooks $n$ are adjustable to fit upon and hold different thicknesses of books, and, as they are independently adjustable, are also adapted to hold a book securely when opened at a point which leaves few pages at one side thereof and many on the other. To adjust the hooks $n$ to the required thickness, the slide $o$ is moved sidewise against the pressure of the spring $q$ to disengage its notch from the side piece of the staple $p'$, and is then moved forward or back to the required position, when it is released, and the spring $q$, pressing on the side thereof, again engages one of the notches $o'$ with the staple $p'$, thus locking the slide $o$ and hook $n$ in the desired position. The hook is adapted to be depressed until its upper point is flush with the upper surface of the slide $o$, as will be readily understood from Fig. 7 of the drawings. For this cause I prefer to make the said hook of wire having a suitable amount of "spring," so that when released after being depressed it will resume its original position. For extremely thin books it may be found that the shelf $m$ will be too broad, and to provide for this I make a slot $r$ in the shelf $m$, said slot being just in front of the point at which the forward staple $p'$ is affixed.

It will be observed that by the use of the hooks $k\ k$ and $n\ n$, I am enabled to securely hold a book of any ordinary size upon the rest, a large amount of latitude in the size of the book being given by the adjustability of said hooks.

I claim—

1. The improved book-rest, consisting of the standard $a$, the horizontal arm $a'$, vertically adjustable thereon, the short arm $d^3$, having on its forward end the plate $d^4$, the plate $f$, connected with the plate $d^4$ by a pivot having a horizontal axis passing through bearings projecting from the proximate sides of said plates, the band or hoop $f^2$ on the plate $f$, the thumb-screw $d^9$, attached to the plate $d^4$ and co-operating with the said band or hoop $f^2$ to lock said plate $f$ in any desired position with relation to the plate $d^4$, the rest proper pivoted to the plate $f$ by a pin having its axis at right angles to the pivot connecting the plates $f$ and $d^4$, the segmental piece $i$ on the plate $f$, provided with notches $i'$ in its outer edge, the spring catch or finger $j$ on said rest adapted to engage one of the notches $i'$ on said segmental piece $i$, and thus lock or latch the rest in various positions with relation to said plate, the adjustable spring-hooks $n$, and the adjustable hooks $k$ on said rest, whereby a book may be retained on said rest in whatever position the latter may be placed, as set forth.

2. The combination, with a standard or upright and a horizontal arm, of a collar attached to said horizontal arm and adapted to slide upon said standard, said collar having a hole cut in it at the portion opposite which said horizontal arm is attached, a gate hinged to the outer side of said collar and adapted to approximately fit said hole, a pad of rubber or other yielding material on the inner side of said gate adapted to pass through said hole and press firmly upon the upright or standard when the gate is closed, and a catch or pin on the collar adapted to engage a suitable catch or hook on said gate to retain the same in its closed position, as set forth.

3. The combination, with a book-rest, of the adjustable retaining device attached to the under part of the shelf or rest proper, the said retaining device comprising the slide $o$, moving in the guides or staples $p\ p'$, attached to the under part of the shelf, said slide being notched on one side to engage the side piece of one of said staples, the spring $q$, adapted to press said slide against said side piece, and the hook $n$, attached to the rear end of the slide $o$ and projecting upwardly through the forward end of the same, as set forth.

In testimony whereof I have signed my name to this specification, in the presence of two subscribing witnesses, this 20th day of December, A. D. 1890.

JULIUS BROWN.

Witnesses:
EWING W. HAMLEN,
ARTHUR W. CROSSLEY.